United States Patent

[11] 3,628,413

[72] Inventor Louis F. Miklos
 6151 Delaware, Gary, Ind. 46409
[21] Appl. No. 27,663
[22] Filed Apr. 13, 1970
[45] Patented Dec. 21, 1971

[54] SHEET METAL CUTTING MACHINE
 9 Claims, 13 Drawing Figs.
[52] U.S. Cl...................................................... 83/513,
  83/522, 83/561, 83/563, 83/565, 83/648
[51] Int. Cl......................................................... B26d 11/00
[50] Field of Search............................................ 83/513,
  522, 599, 648, 565, 563, 561; 408/703; 144/24

[56] References Cited
 UNITED STATES PATENTS
 45,841 1/1865 Low.............................. 83/513 X
 513,851 1/1894 Wheeler....................... 83/513 X Primary Examiner—Frank T. Yost
Attorney—Kinzer, Dorn and Zickert ABSTRACT: A cutting machine for cutting out sheet metal panels for elbows and other curved duct sections, including a table for supporting a sheet metal workpiece and two sets of notching devices, mounted adjacent two different sides of the table. A common positioning drive links the two sets of notching devices. At least one cutter is mounted on a support arm that swings the cutter across the table to cut the workpiece along a desired arc. Index devices coordinate the cutter positions with the notching devices to align the notches and the cut.

Inventor
Louis F. Miklos
By Kinzer, Dorn and Zickert
Attorneys

Inventor
Louis F. Miklos
By Kinzer, Dorn and Zickert
Attorneys

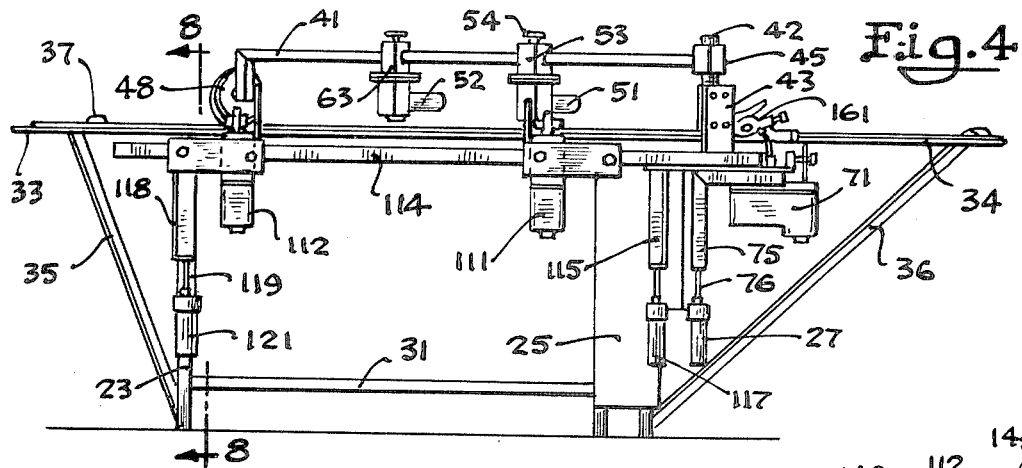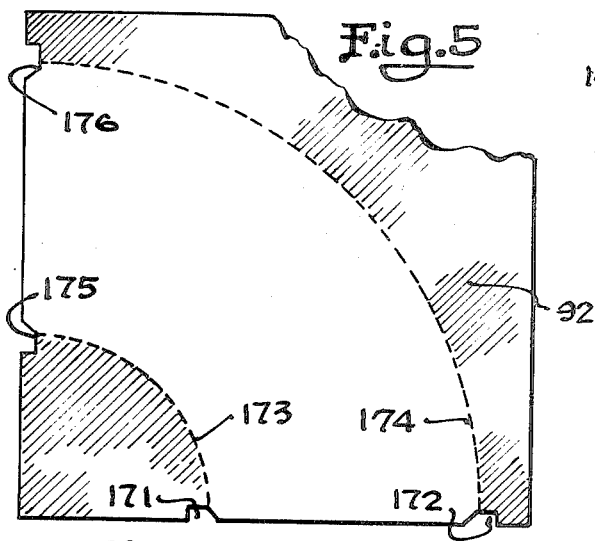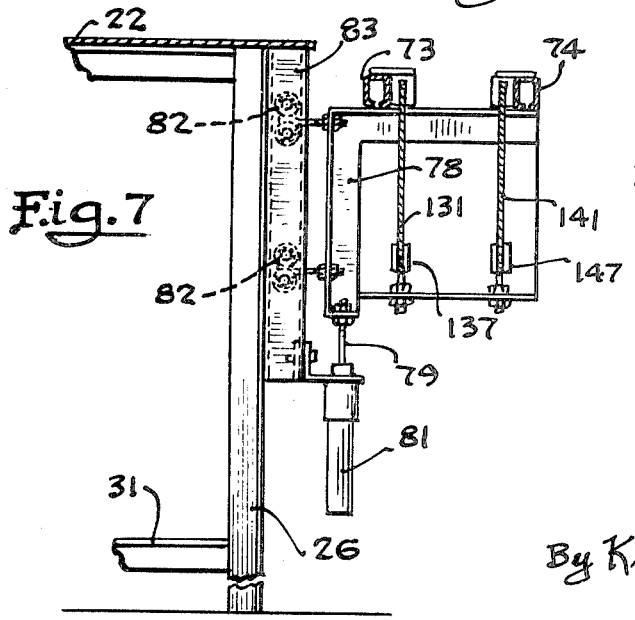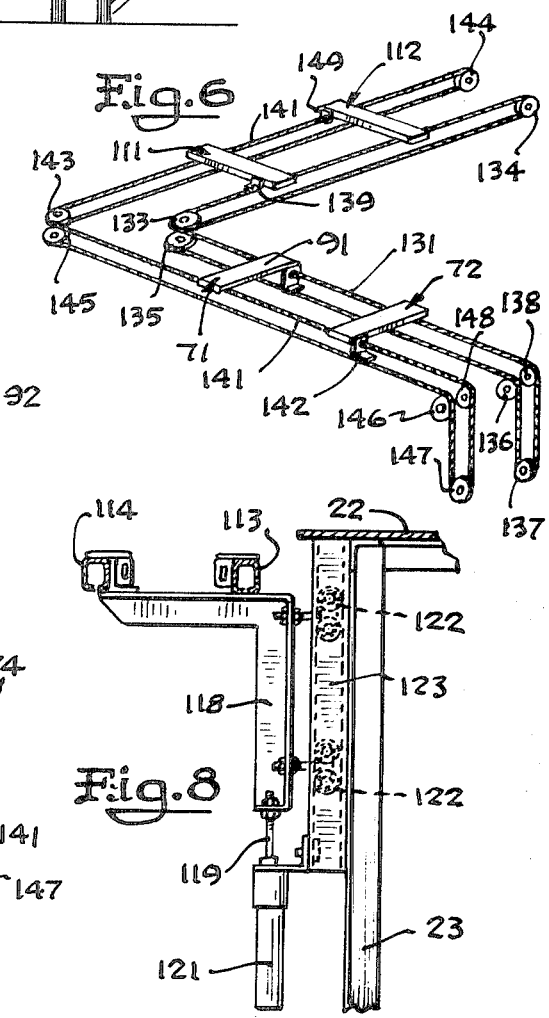

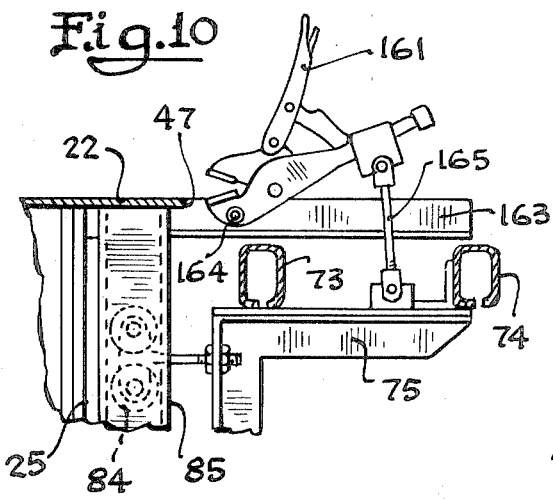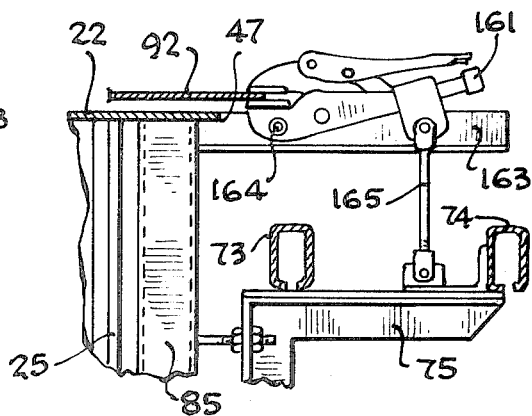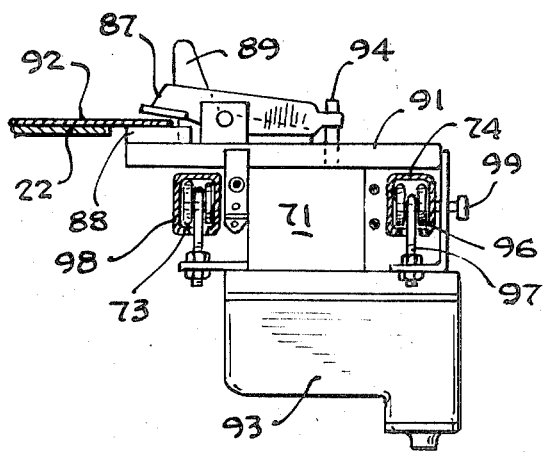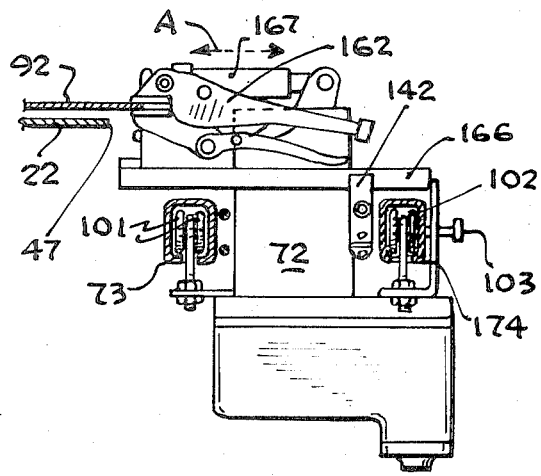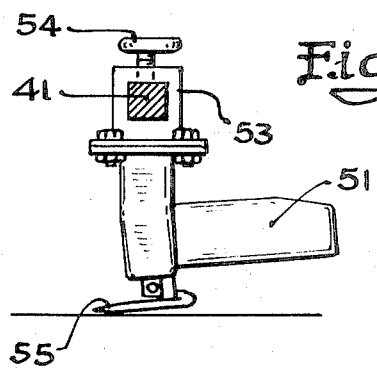

3,628,413

SHEET METAL CUTTING MACHINE

BACKGROUND OF THE INVENTION

In the fabrication of sheet metal duct work, even on relatively large jobs in which there are many repetitive fittings, the side panels for elbows, offset sections, and other fittings, commonly known as cheeks or ways in the trade, have usually been cut out by what amounts to a manual process. The layout of even a simple elbow can be relatively difficult; the workman must locate a center, accurately set dividers for both inner and outer radii and then scribe and cut both inner and outer arcs from the blank sheet metal. He must also cut accurately located notches at both ends of the cheek and must make adequate allowance for flanges in accordance with the requirements of the seaming system being used on the ductwork. In general, the fabrication of these fittings has been relatively slow work, and has required skilled sheet metal workers throughout the fabrication operation.

SUMMARY OF THE INVENTION

It is a principal object of the invention to provide a new and improved machine for cutting outside panels and other components for elbows, offsets, and other curved fittings for use in the fabrication of sheet metal ducts of rectangular cross-sectional configuration, which machine is at least partially automated in its operation.

A more specific object of the invention is to provide a sheet metal cutting machine for the fabrication of components for elbows and other curved sheet metal duct sections that can easily be operated by a relatively unskilled operator, or by an apprentice, with a minimum amount of instruction.

Another object of the invention is to afford a sheet metal cutting machine capable of producing all of the parts required for elbows in sheet metal duct work of rectangular cross-sectional configuration at a high rate of production, at least many times higher than the production rate that can be achieved by a skilled workman using conventional techniques.

Accordingly, the invention relates to a sheet metal cutting machine for use in cutting out side panels for elbows and other curved fittings to be used in sheet metal ducts of rectangular cross-sectional configuration. The machine comprises a table having first and second sides with a first notching means mounted adjacent the first side of the table and a second notching means mounted adjacent the second side of the table. The two notching means are linked by positioning means that simultaneously coordinately adjusts the positions of the two notching means along the first and second sides of the table. The cutting machine includes actuating means for actuating both of the notching means to notch two sides of a sheet metal workpiece supported on the table. A cutter arm is pivotally mounted for swinging movement across the table; at least one cutter is adjustably mounted on that arm, the cutter being effective to cut a sheet metal workpiece along an arcuate path as the arm swings across the table. The machine further includes index means for coordinating the position of the cutter on the cutter arm with the positions of the aforementioned notching means.

BRIEF DESCRIPTION OF THE DRAWINGS

FIG. 4 is a side elevation view of the cutting machine of FIG. 1;

FIG. 5 is a plan view of a workpiece at an intermediate stage of processing by the cutting machine;

FIG. 6 is a perspective schematic view of a positioning drive means incorporated in the cutting machine;

FIG. 7 is a sectional elevation view taken approximately along lines 7—7 in FIG. 2;

FIG. 8 is a sectional elevation view taken approximately along lines 8—8 in FIG. 4;

FIG. 9 is a detail sectional view taken approximately along line 9—9 in FIG. 3;

FIG. 10 is a detail sectional view taken approximately along line 10—10 in FIG. 3;

FIG. 11 illustrates the mechanism of FIG. 10 in a different operating condition;

FIG. 12 is a detail sectional view taken approximately along line 12—12 in FIG. 3; and FIG. 13 is a detail view of one of the cutters used in the machine.

DESCRIPTION OF THE PREFERRED EMBODIMENTS

Figure 1:
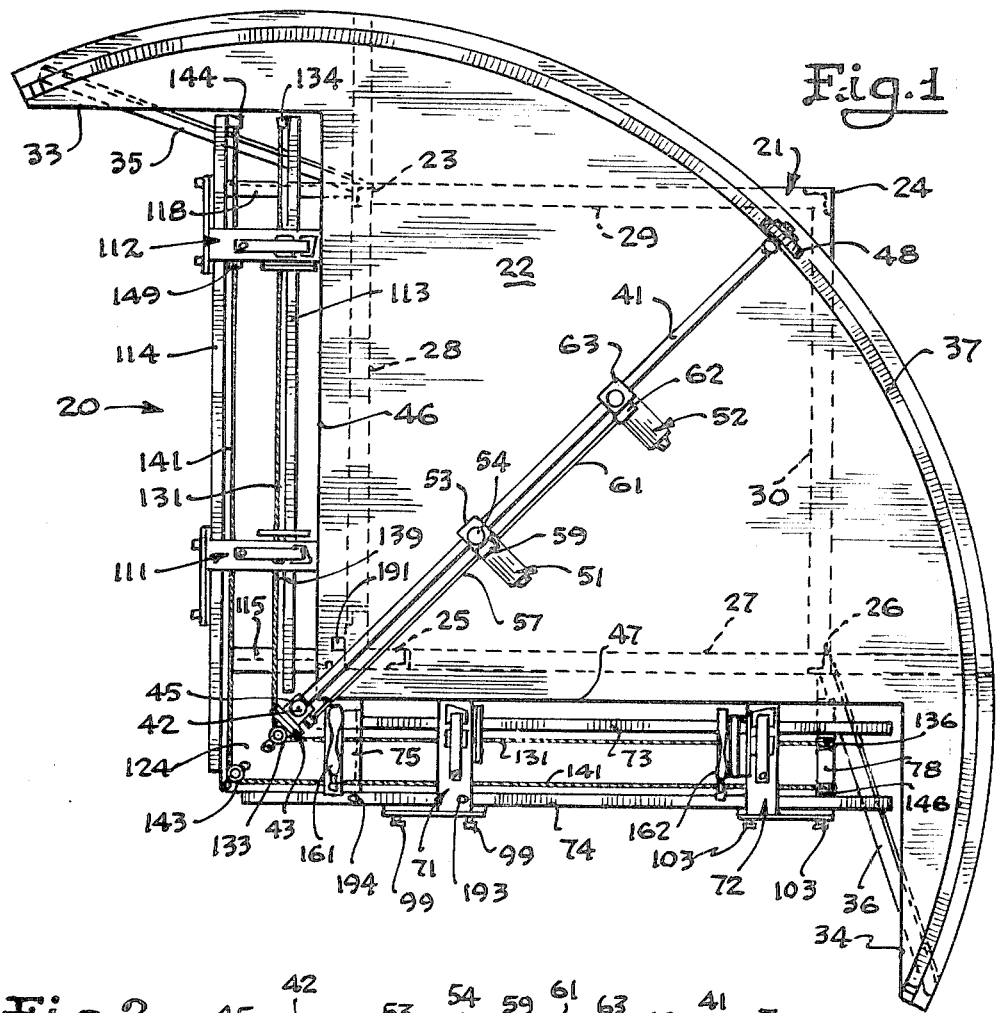
FIG. 1 is a plan view of a sheet metal cutting machine constructed in accordance with one embodiment of the invention.

FIGS. 1 through 4 afford a general illustration of a cutting machine 20 constructed in accordance with a preferred embodiment of the present invention. The cutting machine 20 comprises a table 21 having a top 22 supported upon four legs 23, 24, 25 and 26. The table top 22 has a configuration corresponding to a quarter-segment of a circle with the center of that circle located adjacent the corner of the table that is supported upon the table leg 25. Leg 25 is of much heavier construction than the other legs of table 21. The frame of table 21 includes four horizontal frame members 27, 28, 29 and 30 located immediately below the table top 22, with additional horizontal bracing 31 between the table legs near the floor.

In cutting machine 20, there is a short extension 33 of table top 22 that projects outwardly of the table top near leg 23 (see FIG. 1). Top extension 33 is supported by an angle brace 35 affixed to leg 23. At the opposite corner of the table there is a similar top extension 34 supported by an angle brace 36 affixed to leg 26. An arcuate track 37 extends around the top of table 22 and along both of the extensions 33 and 34. The arc subtended by the track 37 is approximately 130°, with about a 20° extension at each of two sides of the table.

At the corner of table 21 near leg 25, a cutter support arm 41 is pivotally mounted upon a short vertical shaft 42. Shaft 42 is supported by a bracket 43 that is in turn mounted upon a cantilever arm 44 that projects outwardly from table leg 25 at an angle of 45° to each of the two edges 46 and 47 of the table (FIG. 1). The end of arm 41 opposite shaft 42 carries a wheel 48. This wheel 48 rides on the arcuate track 37 as the arm 41 is pivoted about shaft 42.

The cutter support arm 41 carries two sheet metal cutters 51 and 52. The mounting of cutter 51 is illustrated in the detail view of FIG. 13. As shown therein, cutter 51 is mounted upon a bracket 53 that fits around the rectangular support arm 41. A clamp 54 is threaded into bracket 53 and can be utilized to clamp bracket 53 at any desired position along the length of bar 41. Cutter 51 includes a cutting head 55 of conventional construction; the complete cutter is essentially similar to the manual cutting tools employed in the sheet metal art and hence need not be described in detail.

Indexing means are provided for each of the two cutters 51 and 52. The indexing means for cutter 51 comprises a steel tape 57 having one end fixed to the bearing member 45 that mounts cutter arm 41 on shaft 42. The other end of tape 57 is coiled within a housing 59 mounted upon the bracket 53 that supports cutter 51. The mounting arrangement for the tape 57 is such that the reading on the tape, at the left-hand edge of the housing 59, as seen in FIG. 1, is the distance from the axis of shaft 42 to the axis of cutter 51.

Mounting the second cutter 52 on cutter arm 41 is essentially similar to the cutter 51, as described for FIG. 13. The indexing means for cutter 52 comprises a steel tape 61. The end of the tape 61 is fixed to the bracket 53 (FIG. 1) that supports cutter 51 at a point which is aligned with the axis of cutter 51. The housing 62 for tape 61 is mounted upon the support bracket 63 for cutter 52 in a position such that the reading on the tape corresponds to the center-to-center spacing between the two cutters 51 and 52.

Figure 2:
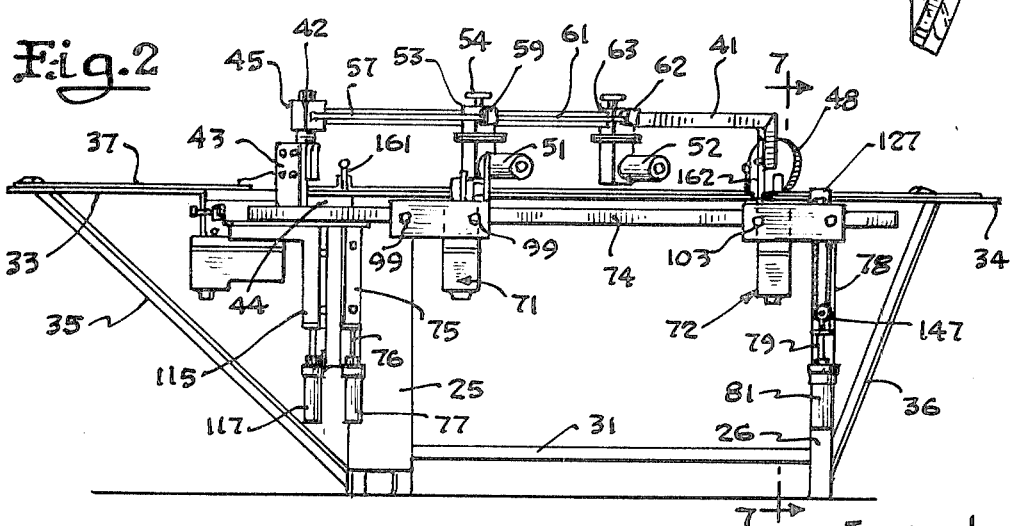
FIG. 2 is a front elevation view of the machine of FIG. 1.
Figure 3:
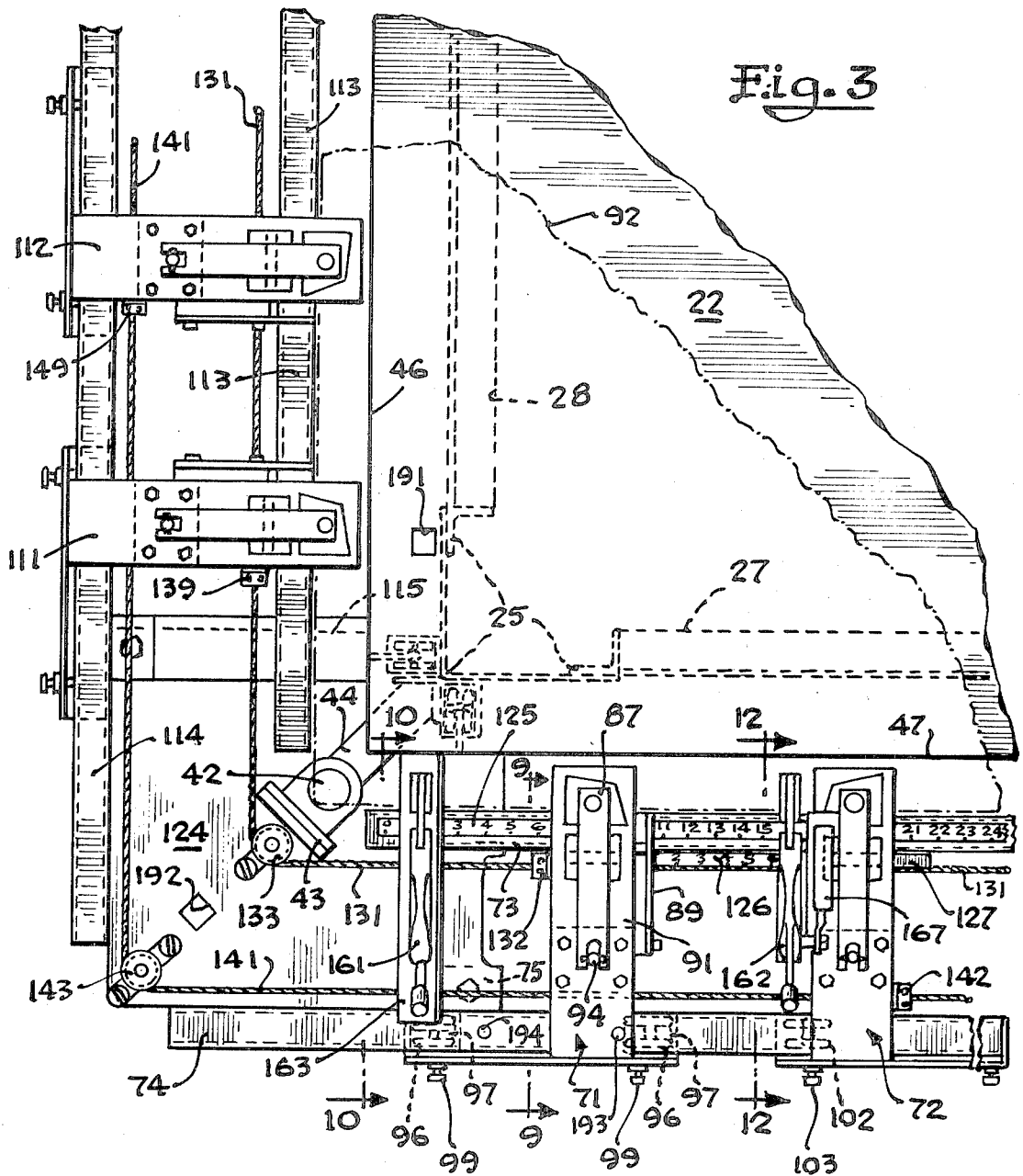
FIG. 3 is a detail plan view, on an enlarged scale, of one corner of the machine of FIG. 1.

Two notching devices 71 and 72 are mounted adjacent the side 47 of table top 22, being supported upon a pair of elongated support members 73 and 74. Support members 73 and 74 are of tubular construction and are generally rectangular in cross-sectional configuration, as shown in FIGS. 10–12. One end of each of the support members 73 and 74 is affixed to an angle member 75 (FIGS. 1–3). Angle member 75 extends downwardly parallel to table leg 25 and is connected to the piston rod 76 of a piston 77. The opposite ends of the support members 73 and 74 are similarly affixed to an angle member 78 having a vertical leg that extends parallel to table leg 26. The lower end of angle member 78 is connected to the piston rod 79 of an operating cylinder 81. As shown in FIG. 7, angle member 78 is connected to two sets of rollers 82 located within a tubular guide member 83 that is mounted upon table leg 26. The rollers 82 guide the angle member 78 for vertical movement. Similarly, the angle member 75 at the other end of the supports 73, 74 is connected to appropriate guide rollers 84 mounted in a tubular guideway 85 as shown in FIGS. 10 and 11. It is thus seen that the support members 73 and 74 and the angle members 75 and 78 form a rigid frame supporting the notching devices 71 and 72, and that frame can be accurately and evenly guided for vertical movement between a working position in which the support members are near the level of table top 22 (see FIGS. 7 and 10) and a retracted position in which the support members are displaced well below table top 22 (FIG. 11).

Notching device 71 is shown in elevation in FIG. 9, with the supports 73, 74 in working position near alignment with table top 22. Notching device 71 includes a punch member 87 pivotally mounted on a base 91 for movement into and out of a die member 88. A guide 89 is mounted on base 91 to limit the insertion of a sheet metal workpiece between the punch 87 and the die 88, as illustrated by the workpiece 92 in FIG. 9.

The notching device 71 further includes a pneumatic or hydraulic actuator 93. Actuator 93 has an output shaft 94 that is connected to a rear extension of the member 87 and is utilized to actuate notching device 71, closing the jaws comprising punch member 87 and die member 88 to cut a notch in the workpiece 92. It will be recognized that notching device 71 is generally conventional in construction; other notching devices can be utilized as desired without departing from the present invention.

The mounting of the notcher 71 on support rails 73 and 74 is also best illustrated in FIGS. 3 and 9. As shown therein, there are two pairs of rollers 96 located within support member 74; each roller pair is mounted on a shaft that is connected to the actuator 71 by a bolt 97. A similar mounting arrangement comprising two sets of rollers 98 (see FIG. 9), connects notching device 71 to the other support member 73. A pair of adjustable pressure members 99 maintain notching device 71 in accurate alignment with rail 74 at any desired position longitudinally of the support rail.

Notching device 72 is essentially similar to notching device 71 and is mounted upon support member 73 and 74 in the same manner as described above for notching device 71. The mounting arrangement is illustrated in FIGS. 3 and 12. As shown therein, notcher 72 is supported upon rollers 101 and 102 mounted within guide rails 73 and 74, respectively. Two pressure members 103 afford a convenient means to maintain notcher 72 in accurate alignment at any desired position along the rails 72, 73.

Two similar notching devices 111 and 112 are mounted adjacent the side 46 of table top 22 and are supported upon a pair of elongated support members 113 and 114. Support members 113 and 114 are of rectangular tubular construction; the support members are affixed to a pair of angle members 115 and 118 mounted upon table legs 25 and 23 respectively. As shown in the detail view of FIG. 8, angle member 118 is affixed to the piston rod 119 of a pneumatic cylinder 121. Angle member 118 is also connected to two sets of rollers 122 located within a vertical guide member 123 that is affixed to the table leg 23. A similar mounting arrangement is provided for the angle member 115 on the table leg 25. Thus, the two support members 113 and 114 and the angle members 115 and 118 afford a rigid and stable frame that can be raised or lowered relative to the table top 22 and that afford a stable support for the notching devices 111 and 112. The mounting of the notching devices 111 and 112 on the support members 113 and 114 is essentially similar to that described above for the notchers 71 and 72 and hence need not be repeated. The two notching device frames are joined together, at the corner near table leg 25, by a plate 124 preferably welded or otherwise securely fastened to all of the guide rails 73, 74, 113 and 114. Thus, machine 20 is provided with a single, unitary notching device frame.

Cutting machine 20 includes positioning means for linking the two different sets of notching devices to permit simultaneous coordinate adjustment of the positions of the notchers along the two sides 46 and 47 of table 21. As shown in FIG. 3, there is a fixed scale 125 mounted upon the upper surface of support member 73. This scale is utilized in positioning notching device 71. A flexible steel scale 126 is affixed to the right-hand side of the notching device 71. Scale 126 extends beneath notcher 72 to a housing 127 that is mounted on the base of notcher 72 (FIGS. 2 and 3). Scale 126 is stored in or pulled from housing 127 automatically, depending upon the movements of notching devices 71 and 72, affording a convenient and easily readable indication of the spacing between the two notchers 71 and 72.

Notching device 71 is affixed to a cord 131 by means of a small clamp or other fastener 132 (see FIG. 3). The path of the cord 131 extends around a pulley 133 mounted on plate 124 adjacent the shaft 42 at the corner of the table. As shown in FIG. 6, cord 131 goes from pulley 133 to another pulley 134, back around a pulley 135 that is coaxial with pulley 133, over a pulley 136, and around a pulley 137 and over another pulley 138 back to the base 91 of notching device 71. Pulley 134 is located at the far end of support member 113 as shown in FIG. 1; pulleys 136–138 are located at the far end of the support member 73 as indicated in FIGS. 1 and 7.

Notching device 111 is also affixed to the cord 131 by an appropriate attaching device 139, as indicated in FIGS. 3 and 6. It is thus seen that whenever notching device 71 is adjusted along table side 47 to a given distance from the table corner, as measured by the scale 125, notching device 111 is automatically positioned along side 46 at the same distance from the table corner. In this way, the one scale 125 determines the coordinate positions for both of the two notchers 71 and 111.

Similarly, notching device 72 is fastened by a clamp or other appropriate fastening device 142 to a cord 141. Cord 141 extends around a pulley 143 that is aligned with but spaced outwardly from the table corner. From pulley 143, cord 141 extends around a pulley 144 located at the far end of support guide 114. The cord comes back around a pulley 145 that is axially aligned with pulley 143 and around three pulleys 146, 147 and 148 located at the far end of the support member 74. From the pulley 148, the cord 141 comes back to complete the loop at the notching device 72. The corresponding notching device 112 on the other side of the machine is affixed to the cord 141 by an appropriate clamp or other fastener 149.

Cutting machine 20 is also provided with means for clamping a workpiece in place on the tabletop 22 while a cutting operation is being performed. This holding or clamping means comprises two clamping devices 161 and 162 as shown in FIGS. 3 and 10–12. The first clamping device 161 is a fixed position device and is mounted upon a short frame member 163 that is affixed to table leg 25. In the simple form shown in the drawings, the clamping device 161 is a pair of vice-grip pliers, sometimes referred to as a plier-wrench, affixed to frame member 163 by suitable means such as a bolt 164. One arm of the plier-wrench construction is connected to an actuating rod 165 that extends downwardly through an appropriate aperture in the frame member 163 and is secured to the frame member 75.

The other clamping device 162 is mounted for conjoint movement with the second notching device 72. As shown in FIG. 12, clamping device 162 may comprise a plier-wrench that is mounted upon the base 166 of notching device 72. Clamping device 162 moves upwardly and downwardly with the frame comprising the guide members 73 and 74. It slides toward and away from the edge 47 of table top 22, as indicated by arrows A in FIG. 12, controlled by a spring-loaded guide 167.

When cutting machine 20 is to be employed in the fabrication of curved side panels for elbows to be employed in a rectangular duct system, it is first necessary to set the machine up for the particular elbow size that is to be fabricated. The operator first adjusts notching device 71 to the desired position for a notch marking the inside corner of the curved panel, the notch 171 in the blank workpiece 92 illustrated in FIG. 5. The positioning of the notching device 71 is determined in accordance with the fixed scale 125. Notching device 111 is automatically moved to the correct position as notcher 71 is moved into alignment. Both notchers are maintained in accurate alignment on the guide rails by their pressure alignment devices, such as the members 99. Positive clamping set screws can be provided if desired.

The second pair of notching devices 72 and 112 is then positioned in the same manner. Notcher 72 is moved to the desired spacing from notcher 71, as indicated upon scale 126. The positioning movement of notcher 72 automatically positions notcher 112, due to the connection between these two devices afforded by cord 141.

With the notching devices accurately lined up, the machine operator pivots the arm 41 to get the two cutters 51 and 52 out of the way, preferably by moving the arm counterclockwise until both cutters 51 and 52 are clear of the table. When this is done, a blank sheet metal workpiece 92 is positioned on the table and is moved as far as possible into the four notchers 71, 72, 111 and 112. Each of the notchers has its own gauge (e.g., gauge 89, FIG. 9) that is aligned with the gauges on the other notching devices, so that the machine operator need exercise no judgment as far as the initial positioning of the sheet metal workpiece is concerned. The operator simply moves the sheet metal workpiece 92 as far as possible into all four of the notchers and then actuates all four notchers simultaneously to cut the notches 171, 172, 175 and 176 in the workpiece.

During the notching operation, the frame supporting the notchers is in raised position as shown in most of the drawings. When notching is complete, the notcher frame is dropped so that it will clear the top of the table for the outline cutting of the sheet metal workpiece. To move the notcher frame downwardly, the four cylinders 77, 81, 117 and 121 are actuated, pulling their respective piston rods downwardly to reposition the notching device frame at the level indicated in FIG. 11. As the notching device frame moves downwardly, the rod 165 pivots the fixed clamp device 161 from the position of FIG. 10 to that of FIG. 11, but with the clamp still open. The operator pushes the other clamping device 162 toward the table to its operational position. The machine operator then closes clamps 161 and 162 (FIGS. 11, 12) to clamp the workpiece in place. Thus, the edge of the workpiece 92 facing the two notching devices 71 and 72 is clamped by the devices 161 and 162 after the notchers have been moved downwardly out of the way. The edge of the workpiece 92 is held above the edge 47 of table top 22 to give the cutters 51 and 52 clearance to engage the workpiece properly.

With the notching completed and the workpiece clamped in place, the operator swings arm 41 to the clockwise limit of its movement. He then moves the two cutting heads 51 and 52 to aligned positions on the arm 41 that correspond to the positions for the notchers. Thus, using scale 57 as a guide, cutter 51 is moved along arm 41 to a position corresponding to the alignment of the notchers 71 and 111. Similarly, the scale 61 enables the operator to adjust the longitudinal position of cutter 52 along arm 41 until it corresponds to the position of notchers 72 and 112. The usual cutting alignment, relative to the notchers, is shown in FIG. 5; the two cuts 173 and 174 that will be performed by the cutters 51 and 52, respectively, are lined up about three-sixteenths inch from the slanted edges of the two notches 171 and 172 that are formed by the notching devices 71 and 72 respectively. Of course, this produces a corresponding alignment with the other notches 175 and 176 that will be formed by the notching devices 111 and 112 respectively.

The operator then energizes the cutters 51 and 52, and begins the cutting operation. The two cutters quickly cut along the arcuate paths 173 and 174 (FIG. 5), completing fabrication of the cheek for a duct elbow. Clamps 161 and 162 hold the sheet metal workpiece in position while the cuts are made.

To cut the other cheek for the same elbow, the procedure is as described above except that there is no necessity for repositioning any of the notching devices or cutters. The time requirement is quite small; all that the operator needs to do is to position the next blank workpiece on the table in the notching devices, with the notching device frame in elevated position. The notching devices are actuated, usually by actuation of a single treadle control. The notching devices are then lowered, again by actuation of a single control, the cutters are switched on, and the cutting operation is completed. It takes less than a minute to produce a complete precision cut side panel for an elbow, as long as the elbow size does not change. Moreover, the setup time for the cutting machine 20 is only about one or two minutes even when going from one elbow size to a completely different size.

Cutting machine 20 is also used in the preparation of the throat and heel wrappers for a completed elbow. The throat and heel wrappers are each of rectangular configuration but do require notching to match up with the side panels of the elbow. This notching is most conveniently accomplished using machine 20 and specifically the notchers 71 and 72 of the machine.

For the preparation of both throat and heel wrappers, the notching device 71 is moved to a predetermined position at the left-hand end of rails 73 and 74. Some convenient locating arrangement can be provided for this purpose; for example, the base of notcher 71 and the rail 74 may be provided with complementary apertures 193 and 194, respectively. The notcher can be moved to the left and a pin inserted through apertures 193 and 194 to obtain rapid alignment of the notcher at the desired position.

The spacing between the notchers 71 and 72, for wrapper production, is dependent upon the width of the duct in which the elbow or other fitting is to be used. Scale 126 (FIG. 3) is employed to set notcher 72 at the required width from notcher 71, once notcher 71 has been established in the required position. Thus, the setup technique for the two notchers is essentially the same as for the manufacture of elbow side panels.

There is a rectangular aperture 191 spaced inwardly a short distance from the left-hand edge 46 of tabletop 22. A gauge is set into the aperture 191 and is used to align a precut wrapper workpiece. In manufacturing a wrapper, the machine operator simply places the precut workpiece against a gauge located in aperture 191 and slides it completely into the two notchers 71 and 72. The hydraulic or pneumatic-operating system for cutting machine 20 is actuated, and notchers 71 and 72 cut the required notches in one end of the wrapper. The wrapper is then turned end-for-end and the process is repeated to notch the other end of the wrapper. The gauge to be inserted in the aperture 191 may have an eccentric external portion, with different overlap over the sides of the aperture 191 corresponding to different flange widths for various seam constructions (e.g., Pittsburgh lock or snap lock seams). The gauge can be stored in a suitable aperture 192 in the plate 124 when the machine is being used to cut cheeks, as described above.

The positioning means that links the two notchers 71 and 111, comprising the cord 131 and the various pulleys around which that cord extends, constitutes one simple and inexpensive arrangement for simultaneously coordinately adjusting the positions of these two notchers along the edges 47 and 46 of table 21. However, a pulley system of this kind is difficult to construct without the introduction of backlash into the machine, and may require considerable attention and maintenance in order to assure continuing accurate positioning of the notchers. Of course, the same considerations apply to the similar positioning means, comprising the cord 141, for the notching devices 72 and 112. Where the additional cost is acceptable, and particularly where relatively high accuracy in the positioning of the notching devices is essential, a lead screw construction, with bevel gear drive couplers at the corner of the table, can be substituted for the cord drive arrangement illustrated without departing in any way from the present invention. Particularly if ball bearing followers are utilized, the notchers can be repositioned directly by sliding them along the rails, with the same operational results as described for the illustrated cord positioning arrangement.

I claim:

1. A sheet metal cutting machine for use in cutting out cheeks and wrappers for elbows and other sheet metal ductwork fittings comprising:
   a table having first and second sides;
   first notching means mounted adjacent the first side of the table;
   second notching means mounted adjacent the second side of the table;
   positioning means, linking the two notching means, for simultaneously coordinately adjusting the positions of the two notching means along the aforesaid sides of the table;
   means for actuating both notching means to notch two sides of a sheet metal workpiece supported on said table;
   a cutter support arm, pivotally mounted adjacent said table for swinging movement across the table;
   cutter means adjustably mounted on said support arm, for cutting a sheet metal workpiece supported on said table along an arcuate path;
   and cutter index means for coordinating the position of said cutter means with the positions of said notching means.

2. A sheet metal cutting machine according to claim 1, in which each of said notching means is mounted upon a frame movable from a working position aligned with the top edge of said table and a retracted position displaced from the top edge of said table to clear said table for operation of said cutter means.

3. A sheet metal cutting machine according to claim 2, in which each of said notching means comprises two notching devices, each device movable independently of the other and each device paired with one of the devices in the other notching means, through said positioning means, for conjoint positioning movement.

4. A sheet metal cutting machine according to claim 3, in which said cutter means comprises two cutters, independently slidably positionable along said cutter support arm at positions corresponding to the positions of respective pairs of notching devices.

5. A sheet metal cutting machine according to claim 4, in which said cutter index means comprises two flexible extensible scales, one extending from a first cutter to the axis of said cutter support arm, the other extending from one cutter to the other.

6. A sheet metal cutting machine according to claim 1, in which said first and second sides of said table intersect at a table corner, in which the pivotal axis of the cutter support arm is located at that table corner, and in which the free end of the cutter arm is supported upon the periphery of said table.

7. A sheet metal cutting machine according to claim 6, in which the free end of said cutter support arm is supported upon a wheel in turn supported upon an arcuate track, constituting a part of and extending around the periphery of the table.

8. A sheet metal cutting machine for use in cutting out component parts for elbows and other sheet metal duct work fittings, comprising:
   a table; notching means, comprising two notching devices, mounted adjacent a first side of the table;
   a notching device positioning means for adjustably positioning said two notching devices, relative to each other and to a fixed index point at one end of said first side of the table;
   means for actuating both notching devices to notch one side of a sheet metal workpiece supported on said table;
   a cutter support arm, pivotally mounted adjacent said table for swinging movement across the table from said first side of said table toward another,
   cutter means, adjustably mounted on said support arm, for cutting a sheet metal workpiece supported on said table along an arcuate path;
   and cutter index means for coordinating the position of said cutter means with the positions of said notching devices.

9. A sheet metal cutting machine according to claim 8, in which said notching device positioning means includes at least one support rail, extending parallel to said first side of the table, for supporting said notching devices, and notching device index means for locating said notching devices longitudinally of said rail, said notching device index means comprising a fixed scale parallel to said rail and a flexible extensible scale extending between said notching devices.

* * * * *